April 11, 1939.  F. A. SMITH  2,153,941
PISTON RING REMOVER
Filed July 15, 1937  2 Sheets-Sheet 1
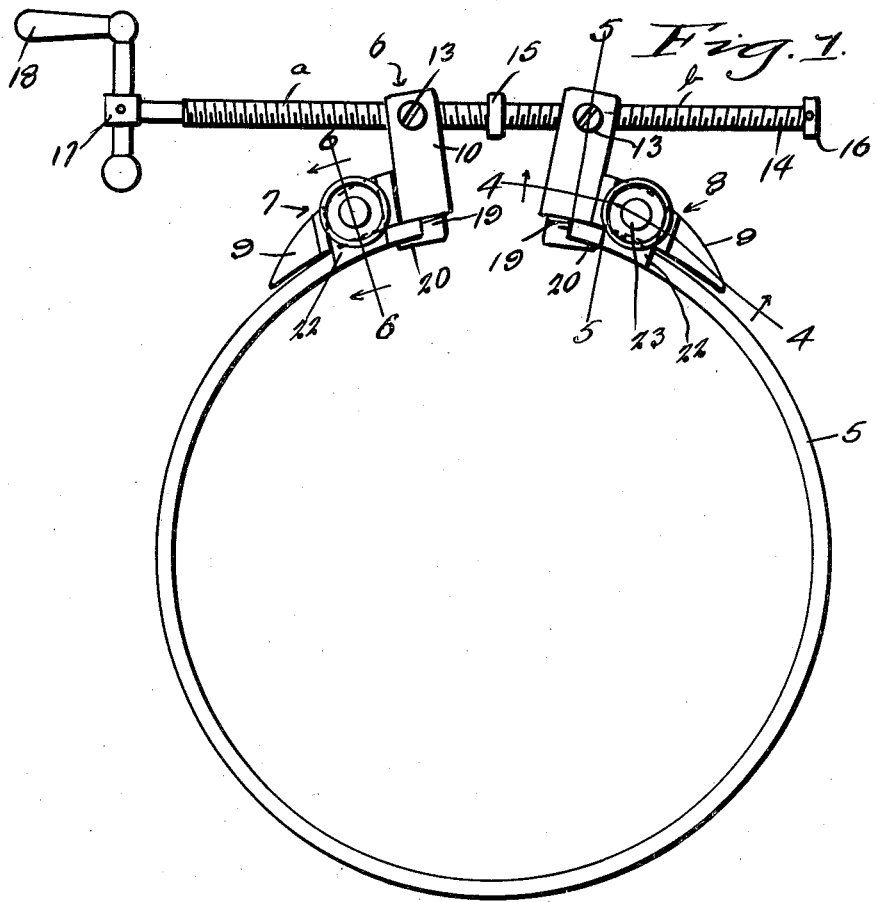
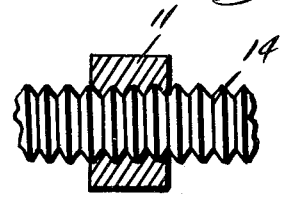
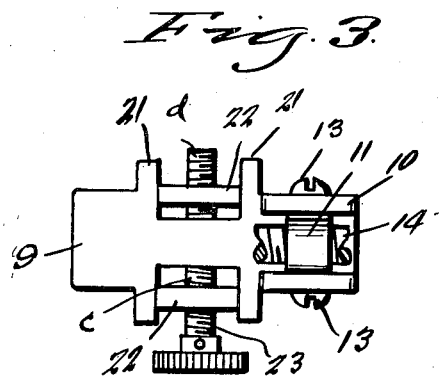
Inventor
Frank A. Smith
By Clarence A. O'Brien
Hyman Berman
Attorneys

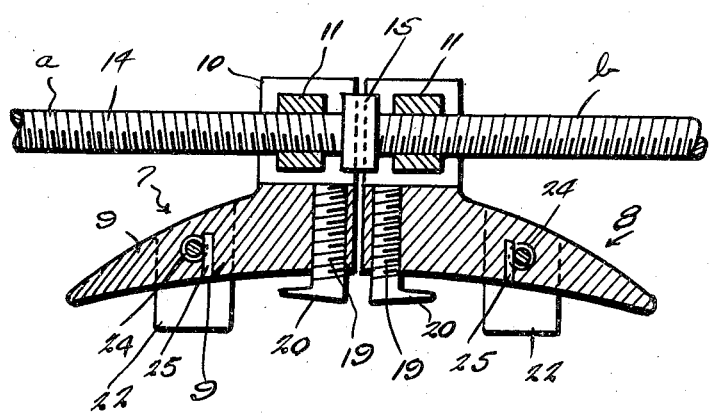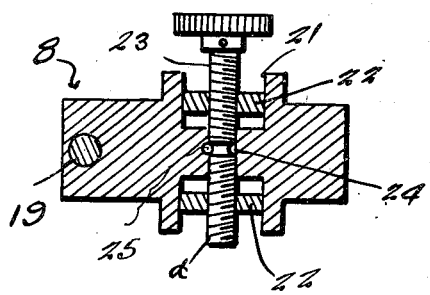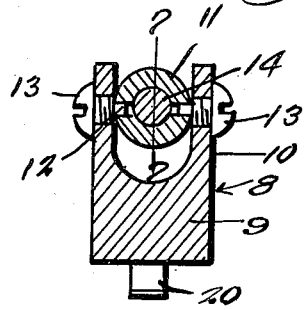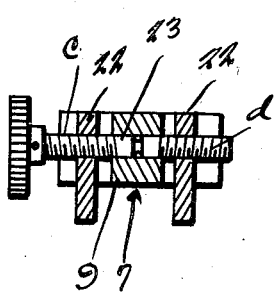

Patented Apr. 11, 1939

2,153,941

UNITED STATES PATENT OFFICE 2,153,941

PISTON RING REMOVER

Frank A. Smith, Hialeah, Fla.; Edna M. Smith, administratrix of said Frank A. Smith, deceased, assignor to Edna M. Smith Application July 15, 1937, Serial No. 153,818

3 Claims. (Cl. 29—86.4)

This invention appertains to new and useful improvements in piston ring removers, and more particularly to a remover of this type especially adapted for heavy duty use as on large marine engines, etc.

The principal object of the present invention is to provide a positive acting tool whereby piston rings can be handled in a quick and convenient manner.

Another important object of the invention is to provide a tool of the character stated especially adapted for heavy duty use which will greatly lessen manual efforts required in removing piston rings of the character employed on large engines of marine vessels.

These and various other important objects and advantages of the invention will become apparent to the reader of the following specification.

In the drawings:

Figure 1 represents a side elevational view of the tool in use.

Figure 2 is a longitudinal sectional view fragmentarily through the tool.

Figure 3 is a fragmentary top plan view of one of the clamps of the tool.

Figure 4 is a section on the line 4—4 of Figure 1.

Figure 5 is a section on the line 5—5 of Figure 1.

Figure 6 is a section on the line 6—6 of Figure 1.

Figure 7 is a sectional view fragmentarily through the screw and one of the nuts, taken substantially on the line 7—7 of Figure 5.

Referring to the drawings wherein like numerals designate like parts, it can be seen in Figure 1 that numeral 5 represents a piston ring with which the tool generally referred to by numeral 6 is engaged.

This tool consists of a pair of block structures 7—8 of substantially identical construction, and a description of one will suffice for both.

Each of these block structures consists of a shoe-like structure 9 having an upstanding angle portion 10 bifurcated to receive a round nut 11. This nut 11 is provided with openings therein to receive the smooth pin-like extensions 12 of the set screws 13 which are driven through the furcations of the angle portion 10.

The elongated screw shaft 14 is provided with right and left hand threads a—b respectively, through the nuts 11—11 and these threaded areas are separated by the circumferential collar 15 on the said screw shaft 14. One end of the screw shaft 14 is provided with the set collar 16 and its opposite end is provided with the bored head 17 through which the shank of the crank handle 18 is adjustably disposed.

Threadedly disposed into the adjacent ends of the shoes 7—8 are the shanks 19 of the hook members 20 which engage over the free ends of the ring 5 as in the manner substantially shown in Figure 1.

Furthermore, each of the shoes 9 is provided with a laterally disposed guideway 21 in which a clamp plate 22 is slidably disposed. Disposed through these guideways 21 on each of the shoes 9 is a screw 23 which has left-hand threads c passing through one of the clamp plates 22 and right hand threads d passing through the other clamp plate 22. The intermediate portion of the screw 23 is provided with a circumferential groove 24 and this groove receives the retaining pin 25 which is driven into the shoe to prevent longitudinal movement of the screw 23.

Thus, it can be seen that the ends of the ring 5 can be inserted into the hook 20 and subsequently the screws 23 can be rotated so as to drive the plates 22 into clamping engagement with the end portions of the ring. Subsequently to this, the screw shaft 14 can be rotated for spreading the ends of the ring.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

1. A piston ring remover comprising a pair of ring end engaging bodies, a screw shaft for contacting and separating the said bodies, pivotal means supporting the screw shaft on each of the bodies, hook means on the said bodies for engaging the ends of a piston ring, and clamp means on the said bodies comprising a pair of slidably mounted clamping plates for engaging the opposite edge portions of the ring and means for oppositely actuating the plates into and out of clamping position.

2. A piston ring remover comprising a screw shaft, piston ring end engaging bodies feedable by the said screw shaft, pivotal means connecting the screw shaft to the bodies, and a pair of clamp plates on each of the ring end engaging bodies slidably mounted for movement transversely of the bodies into and out of engagement against opposite sides of the piston ring.

3. A piston ring remover comprising a screw shaft, piston ring end engaging bodies feedable by the said screw shaft, pivotal means connecting the screw shaft to the bodies, and a pair of clamp plates on each of the ring end engaging bodies slidably mounted for movement transversely of the bodies into and out of engagement against opposite sides of the piston ring, guides on the bodies for said plates, and adjustable hook members on the said ring end engaging bodies for receiving the extremities of a ring.

FRANK A. SMITH.